(12) United States Patent
Katz et al.

(10) Patent No.: US 7,821,156 B2
(45) Date of Patent: Oct. 26, 2010

(54) SYSTEM AND METHODS FOR SCHEDULING POWER USAGE

(75) Inventors: Jeffrey Sherman Katz, West Hartford, CT (US); Gerard Marmigere, Drap (FR); Frederic Bauchot, Saint-Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 12/027,926

(22) Filed: Feb. 7, 2008

(65) Prior Publication Data

US 2009/0200867 A1 Aug. 13, 2009

(51) Int. Cl.
*H02J 3/14* (2006.01)
(52) U.S. Cl. .............................. 307/40; 307/35; 307/38
(58) Field of Classification Search .................... 307/35, 307/38, 40
See application file for complete search history.

(56) References Cited

U.S. PATENT DOCUMENTS

| | | | |
|---|---|---|---|
| 4,850,010 A | 7/1989 | Stanbury et al. | |
| 5,436,510 A * | 7/1995 | Gilbert | 307/38 |
| 5,502,339 A | 3/1996 | Hartig | |
| 5,761,083 A | 6/1998 | Brown et al. | |
| 6,167,389 A | 12/2000 | Davis et al. | |
| 6,529,839 B1 | 3/2003 | Uggerud et al. | |
| 7,561,977 B2 * | 7/2009 | Horst et al. | 702/62 |
| 2004/0117330 A1 | 6/2004 | Ehlers et al. | |
| 2004/0153170 A1 * | 8/2004 | Santacatterina et al. | 700/1 |
| 2006/0190139 A1 | 8/2006 | Reaume et al. | |

FOREIGN PATENT DOCUMENTS

| | | |
|---|---|---|
| EP | 1372238 | 12/2003 |
| EP | 1566875 | 8/2005 |
| WO | WO 2007/092503 | 8/2007 |

* cited by examiner

*Primary Examiner*—Jared J Fureman
*Assistant Examiner*—Carlos Amaya
(74) *Attorney, Agent, or Firm*—Novak Druce + Quigg

(57) ABSTRACT

A system for scheduling electric power consumption cycles is provided. A consumption cycle is a time period of human scale, minutes or hours typically, rather than an electrical cycle. The system includes an electric-powered device driven by power supplied by an electric power network. The system also includes a consumption cycle data (CCD) requesting module communicatively linked to the electric-powered device. The link may use electric power lines via methods such as Broadband over Power Line, or may be wireless. The CCD requesting module is configured to generate a CCD request requesting allocation of electric power from the electric power network. Additionally, the system includes an electric power network node electrically connected to the electric-powered device from which electric power is conveyed to the electric-powered device. The system also includes a CCD responding module communicatively linked to the CCD requesting module. The CCD responding module is configured to determine whether the request for allocation of power can be granted subject to a predetermined capacity constraint.

19 Claims, 7 Drawing Sheets

| time | Capacity |
|------|----------|
| t1   | 10       |
| t2   | 8        |
| t3   | 8        |
| t4   | 7        |
| t5   | 8        |
| t6   | 5        |
| t7   | 5        |
| t8   | 5        |
| t9   | 7        |

SYSTEM AND METHODS FOR SCHEDULING POWER USAGE

FIELD OF THE INVENTION

The present invention is related to the field of data processing systems, and more particularly, to data processing systems for efficiently allocating power supplied to multiple consumers connected to a power grid.

BACKGROUND OF THE INVENTION

Consumer demand for electric power typically varies, often considerably, during the course of a single day. Moreover, each individual consumer's demand for electric power generally is highly correlated with other consumers connected to the same power grid. For example, many consumers are likely at or near the same time to increase their energy consumption during the morning hours when consumers are first waking up and want to have plenty of hot water for bathing. Similarly, the demand for electric power drawn from the power grid is likely to increase jointly during summer afternoon hours when numerous consumers are running their air conditioners. Peak demand, of course, affects network capacity and for an electrical energy provider to purchase electrical energy from other suppliers connected to the same electric power grid. Reducing peak demand can avoid building generating capacity for a small peak timer period, say 100 hours during the summer.

In order to address the situation, some electrical energy providers have adopted multi-tier pricing. During certain periods of the day corresponding to high-demand periods, consumers are charged a higher price, and correspondingly, during periods of low demand consumers are charged a reduced price for electric power. The pricing scheme is intended to shift consumer demand so as to reduce electric power consumption during periods that are otherwise high-demand periods.

To take advantage of the pricing scheme, the electrical transmission network can include a mechanism for conveying over power lines (not limited, however, to a power line conveyance, but including for examply an FM radio sub-carrier) a so-called triggering pulse, which signals the beginning of a reduced-rate period. The pulse can be used for specific equipment configured to recognize the pulse, such as a water heater that is enabled in response to the pulse.

An inherent problem with current implementations of such schemes, however, is that the result can be the opposite of that intended. For example, if the triggering pulse is transmitted by an electrical energy provider to a large population of its subscribers, power consumption can spike as various electricity-consuming appliances simultaneously turn-on or are enabled to thermostatically turn on in response to the triggering pulse.

SUMMARY OF THE INVENTION

The present invention is directed to systems and methods for scheduling electric power consumption cycles for a plurality of electric-powered devices connected to an electric power network or grid. In one aspect, the invention provides mechanisms and procedures whereby requested or planned allocations of electric power to various devices connected to an electric power network or grid can be ascertained. Another aspect of the invention is that the electrical power consumption of the various devices can be ordered, globally for the entire power network, so as to smooth out the pattern of aggregate power consumption. In yet another aspect, the invention enables power consumption cycles for each electric-powered device to be timed according to an established schedule subject to certain prescribed physical and/or contractual constraints. Accordingly, the invention can be utilized to optimize, subject to such constraints, the allocation of electric power among the plurality of electric-powered devices.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

The present invention is directed to systems and methods for scheduling electric power consumption cycles during which different electric-powered devices consume electric power supplied by an electric power network or grid. The system and methods can be utilized to automatically determine the different power consumption requirements of various devices connected to the electric power network. Based upon the requirements of the devices and subject to certain imposed constraints—constraints arising from physical limitations on power consumption or contractual constraints imposed by an electric power provider—the electrical power consumption of the various devices can be ordered in a global sense so as to smooth out the pattern of power consumption over the entire electric power network. Power consumption cycles for each device, accordingly, can be set for particular times according to an established schedule subject to the imposed physical and/or contractual constraints. The scheduling can be used to optimize the allocation of electric power subject to one or more physical or contractual constraints. This optimization extends to maintaining the voltage stabilization of the distribution grid and its cascading effects on such system's protective devices and ultimate generation demand requests.

As used herein, the term capacity refers to a measurement specifying the amount of energy that a device requires or consumes per a given time period. Likewise, capacity refers to a measurement specifying the amount of energy that a meter or station in an electric power network can support. Various units of measure can be used with respect to capacity, including for example, watts, Joules, and kilowatt-hours. The term device, as used herein, encompasses any electric equipment or appliance, such as an air conditioner, a furnace, a dishwasher, a washing machine, a water-heater, a microwave oven, or the like, which is driven by electrical energy. As used herein, the term meter denotes equipment installed at a site, such as a home or building. Multiple circuits can connect to the meter to power various devices, and one or more devices can be on a circuit connected to the meter. The term station, as used herein, corresponds to any electric power grid equipment interconnecting several electrical links, which can correspond to branches of a tree structure representing the electric power network or grid. A station is denoted a primary station when interconnecting several meters and is denoted a secondary station when interconnecting several primary stations. As used herein, the phrase time period corresponds to a unit of time.

The number of levels in the power network or grid structure is not a limitation on the invention. For the sake of clarity in exposition, the invention is described herein in the context of a power grid structure that can include meters, primary stations and secondary stations, as well as a generation station for powering the grid.

Power grid, as the term is used herein, can be more general than the classic large scale power grid, thereby allowing for more localized designs such as micro-grids and/or local distributed or alternative generation. The term power station thus is used herein as illustrative of the classic large generation/mass distribution systems common today. The invention is thus independent of the ultimate number of other power users; in any contex, the embodiments of the invention provide efficient and effective mechanisms for allocation subject to various constraints.

Figure 1:
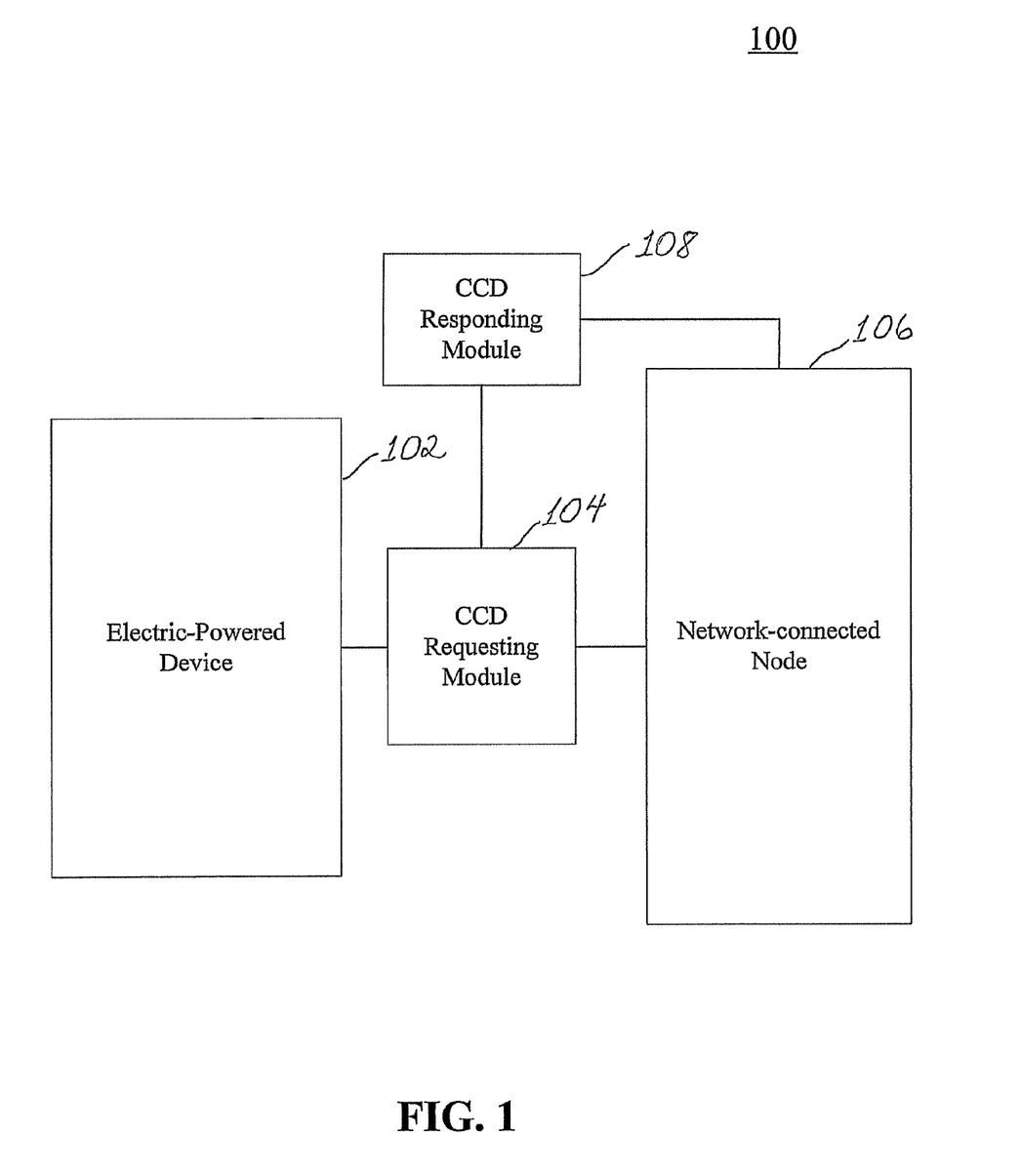
FIG. 1 is a schematic view of a system for scheduling electric power consumption cycles, according to one embodiment of the invention.

FIG. 1 is a schematic view of a system 100 for scheduling electric power consumption cycles, according to one embodiment of the invention. The system 100 illustratively includes an electric-powered device 102, which is configured to be driven by power supplied through an electric power network. The system 100 also illustratively includes a consumption cycle data (CCD) requesting module 104 communicatively linked to the electric-powered device. Additionally, the system illustratively includes an electric power network node 106 electrically connected to the electric-powered device 102. The system 100 also illustratively includes a CCD responding module 108 communicatively linked to the CCD requesting module.

One or both the CCD requesting module 104 and CCD responding module 108 can be implemented in computer-readable code configured to execute on a computing device, such as a general-purpose or application-specific computer, for causing the computing device to execute computer-readable instructions for performing the procedures described herein. Alternatively, however, one or both the CCD requesting module 104 and CCD responding module 108 can be implemented in dedicated hardwired circuitry configured to effect the same procedures. In still another embodiment, one or both the CCD requesting module 104 and CCD responding module 108 can be implemented in a combination of computer-readable code and dedicated circuitry.

In a particular embodiment, both the CCD requesting module 104 and CCD responding module 108 can comprise programmable logic controllers (PLCs). The physical embodiment can take on several forms, as computing devices can be embedded in other primary purpose devices, such as major home appliances or electric meters supplied by utility companies. Both the CCD requesting module 104 and CCD responding module 108 can exchange data messages according to a known communication protocol that facilitates two-way communication over a data communications network. In alternative embodiments, however, alternative communications mechanisms can be employed to facilitate message exchanges between the CCD requesting module 104 and CCD responding module 108. For example, wireless technologies, such as the Worldwide Interoperability for Microwave Access (WiMAX) telecommunications technology based on the IEEE 802.16 standard, can be utilized to enable wireless data exchanges over relatively long distances in various ways, from point-to-point links to full mobile cellular type access. The present invention is communication agnostic.

Operatively, the CCD requesting module 104 is configured to generate a consumption cycle data CCD request for an allocation of electric power from the electric power network with a specified time period. The CCD responding module 108 communicatively linked to the CCD requesting module 104 in turn is configured to determine whether the request for allocation of power can be granted subject to a predetermined capacity constraint.

More particularly, according to one embodiment, the CCD requesting module 104 is configured to wait for a user programming request. Through this programming request, a user can specify the time period during which the electric-powered device 102 is to be powered by the electric power network. For example, if the electric-powered device 102 is an appliance, such as a washing machine, the user can specify that the appliance is to be run for a certain duration between a designated start time and a designated end time, the later period perhaps corresponding to times during which reduced electricity charges are levied by an electric power provider. The ability for the appliance to know the high price time period is considered within the scope and is merely an automation of a step elected by the user (user puts appliance in "economy" mode_). Note too that motivation for the signal from the utility may originate for a variety of reasons, from high demand in total of the electric grid causing stress (voltage drops) to accommodating generating equipment failures or transients that cause frequency shift (outside the band 60+/− 0.5 Hz in the U.S.)

According to this embodiment, the CCD requesting module 104 detects the user programming request and responds by generating the CCD request. The CCD requesting module 104 conveys the request to the CCD responding module 108 and wait for a CCD response. In waiting for the CCD response, the CCD requesting module 104 can optionally be configured to handle the event that no CCD response is received. For example, the CCD requesting module 104 can be configured to handle such an event by initially starting a timer and, if the CCD response is not received within a designated time period, handling the event as a should-not-occur event.

When the CCD requesting module 104 detects a CCD response, the CCD requesting module 104 determines whether or not the response to the CCD request is positive (i.e., the requested allocation of power is granted). If the response is positive, the CCD requesting module 104 schedules the device to operate at a time specified in the CCD response.

More particularly, the request generated by the CCD requesting module 104 can comprise a particular set of data. The data can include a unique identifier that identifies the electric-powered device 102. In a particular embodiment, device identifier can comply with the Electronic Product Code (EPC) standard. The data can also specify the required capacity of electric power, K, needed to power the electric-powered device 102 as well as the duration, D, for which it is required during the next-to-occur consumption cycle. This information can be learned or determined by the device from the user through an applicable user interface (e.g., the user selecting the washing program of a dishwasher). Additionally, or alternatively, the information can be determined by the device itself, which can be equipped with sensing capabilities for sensing certain operational parameters (e.g., a water heater can include sensors for measuring the volume and temperature of water remaining in the water heater's tank). In any event, the CCD request generated by the CCD requesting module 104 defines a request for a consumption cycle that is characterized by the required capacity (measured in a designated capacity unit) of the consumption cycle and the required duration (measured in designated time period units) of the consumption cycle. The period, P, during which the consumption cycle is to occur, moreover, can be specified by a start-after time, Sa, as well as a stop-before time, Sb, which as already noted can correspond to a period during which low-cost electricity rates are in effect.

According to a particular embodiment, the CCD responding module 108 communicatively linked to the CCD requesting module 104 receives the CCD request and responds by determining whether the CCD request can be granted subject to a predetermined capacity constraint. In an initial state, the CCD responding module 108 waits for a CCD request. When a CCD request is detected, the CCD responding module 108 computes a ceiling capacity parameter, m, which specifies a maximum capacity that can be delivered during a specified period of time. The maximum can be dictated by physical constraints of a meter or station of the electric power network or by contract limitations specified by the electric power provider. More particularly, the ceiling capacity parameter, m, can be computed as $$m = \text{Max}_T(\text{Min}_t(C(t) - K^T(t)),$$

where C represents capacity as a function of time, K is, again, duration, as a function of time, indexed to depend on time, T, when an associated consumption cycle starts. $T \in [Sa, Sb-D]$ and $t \in [Sa, Sb]$.

Figure 2:
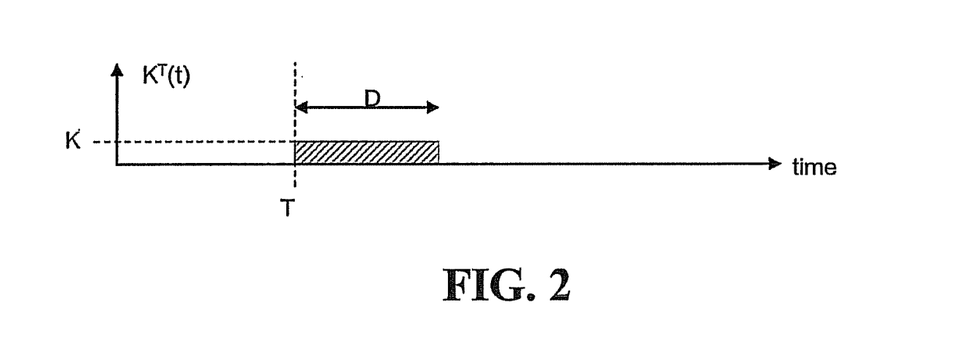
FIG. 2 is an exemplary plot of network node capacity as a function of time.

FIG. 2 is a graph of an exemplary time function $K^T(t)$ associated with a CCD response. As shown in the graph, $K^T(t)$ depends on the particular time T that a consumption cycle starts.

Figure 3:
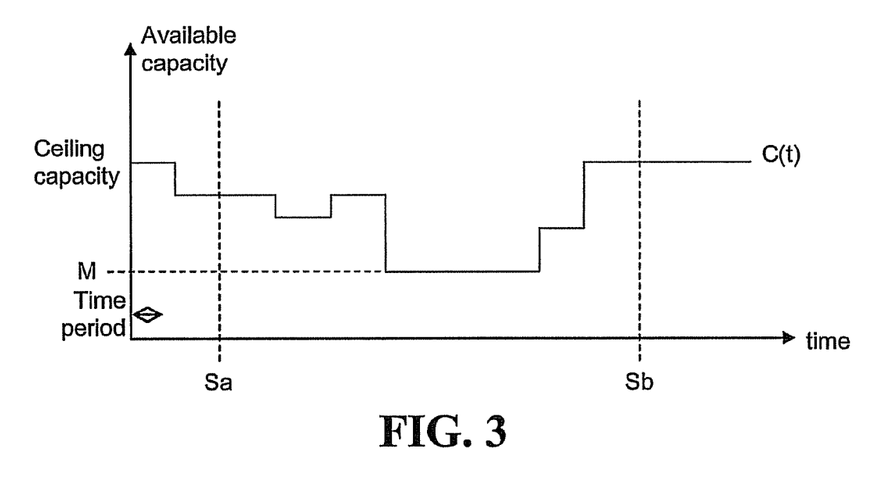
FIG. 3 is an exemplary plot of ceiling capacity for a network node, the ceiling capacity being a function of time.

FIG. 3 is an illustrative graph of the capacity, C(t), of the network node 106 communicatively linked to the CCD responding module 108. As illustrated, the capacity, C(t), varies over time, t.

Figures 4, 5:
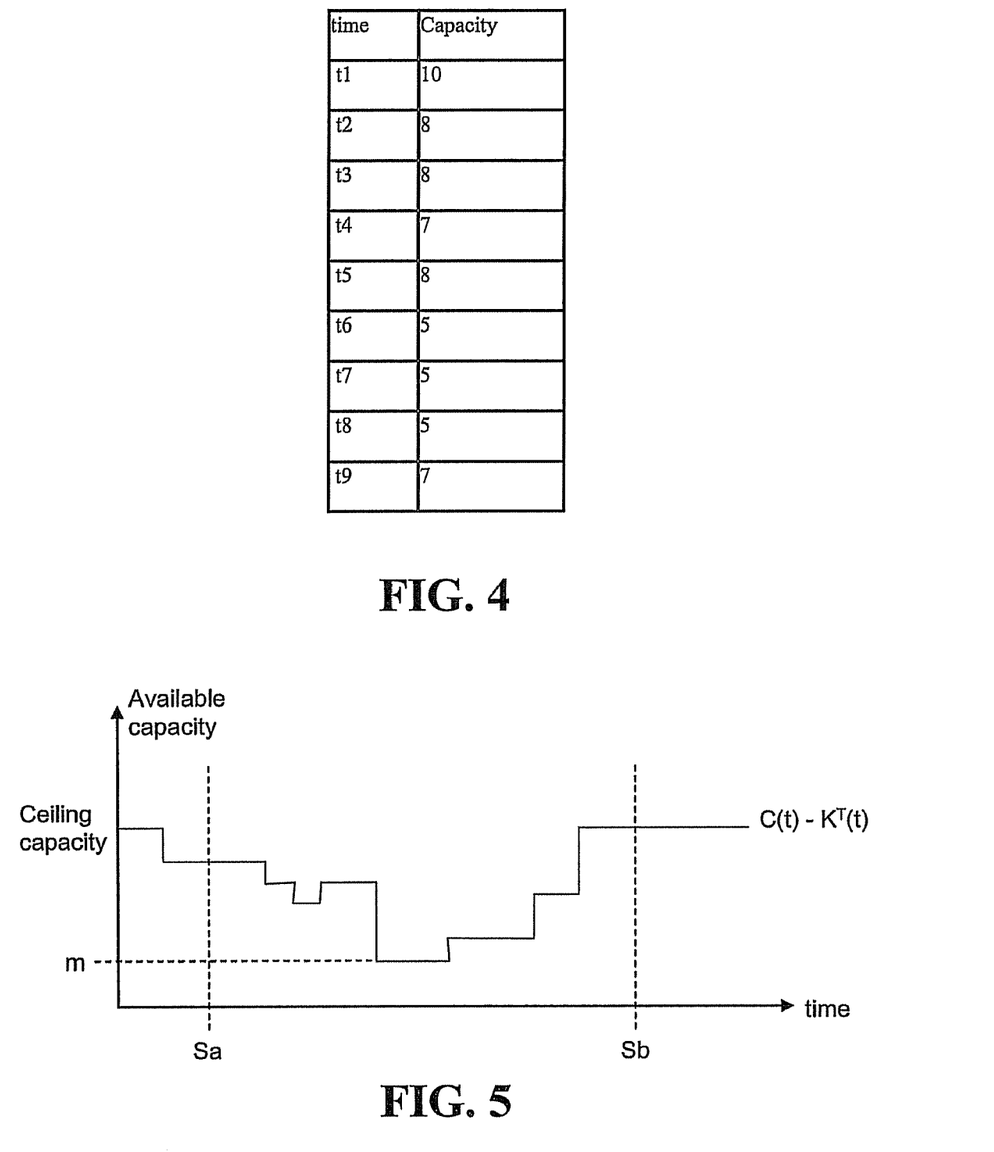
FIG. 4 is a representative table generated and maintained by the system in FIG. 1, according to one embodiment of the invention.
FIG. 5 is an exemplary plot of capacity and a computed capacity parameter, both plotted as functions of time.

FIG. 4 illustrates an optional feature of the CCD responding module 108 in which, according to one embodiment, the CCD responding module is configured to maintain an updatable table for the network node 106. The exemplary values shown in the table correspond to the capacity, C(t), illustrated in FIG. 3 at particular times, t1-t9. The table records available capacity of the network node 106 for next-to-occur periods. Granularity of the time axis can be set equal to the time period. The table values are upper bounded by the ceiling capacity parameter and can be lower than the upper bound if some CCD requests have already been handled, thus reserving some power capacity of the network node 106. Moreover, the table can be read and updated to accommodate situations known to the electric power provider. The CCD responding module, moreover, can be configured to execute in the background a house-keeping routine to refresh the table by deleting any table record corresponding to elapsed time; for example, the table can be organized as a cyclic structure covering a 24-hour period and including a pointer to the current time period.

FIG. 5 is a graph of the capacity and the computed ceiling capacity parameter, m, with respect to the network node 106 for the exemplary values used in FIGS. 2-4. The parameter, m, is computed according to the above-described equation.

If, for an available time, the ceiling capacity parameter, m, is greater than zero, then the CCD responding module 108 can convey a positive response (represented, for example, by a flag or Boolean variable, R) to the CCD requesting module 104. More generally, the CCD responding module 108 determines whether the requested allocation of electric power, indicated by capacity K, can be granted for the duration, D, requested during the period, P, given determined capacity constraint. If so, the CCD responding module 108 selects a time T (perhaps the earliest time that allocation can be granted), and conveys a positive message to the CCD requesting module 104. The message indicates that the consumption cycle for the electric-powered device 102 can begin at time T.

The operative features of the system 100 can be described in a broader context wherein the electric power network comprises a plurality of electric-powered devices, each electrically connected to a network node comprising a meter, which in turn, is electrically connected to one or more upstream nodes comprising stations. Each station can electrically connect to an electric power generator. An exemplary arrangement is schematically illustrated in FIG. 6.

Figure 6:
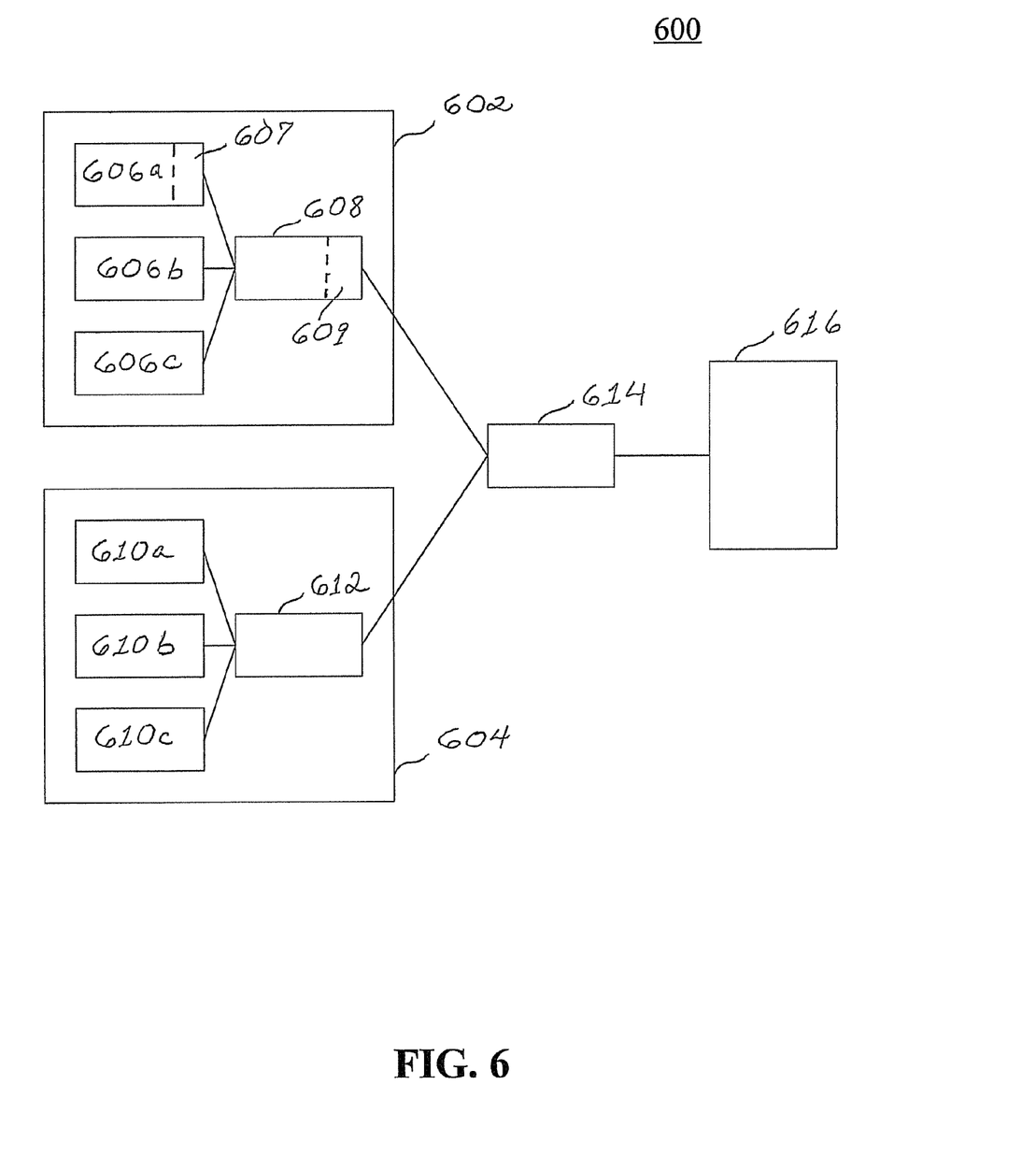
FIG. 6 is a schematic view of an electric power network in which the system in FIG. 1 can be utilized.

FIG. 6 is a schematic view of an electric power network 600. The electric power network 600 illustratively includes two distinct sites 602, 604. One site 602 comprises a plurality of electric-powered devices 606*a-c*, which are each electrically connected to a node comprising a meter 608. The other site 604 likewise comprises a plurality of electric-powered devices 610*a-c* that are each connected to a network node comprising a meter 612. Both of the meters 608, 612 are connected to another node, comprising a station 614, which is electrically connected to an electric power generation station 616.

Operatively, each of the devices 606*a-c*, 610*a-c* at each site 602, 604 can include a CCD requesting module (shown explicitly only for device 606*a*, as CCD requesting module 607) configured to implement the CCD requesting procedures as already described. Each meter 608, 612 as well as the station 614 can each comprise a CCD responding module (shown explicitly only for meter 608, as CCD responding module 609) configured to implement the responding procedures also described already. In this exemplary environment, the operative features of a system for requesting consumption cycles can be described by considering one of the electric-powered devices to be an appliance, such as a washing machine, which a user wishes to run during non-peak hours between 6 PM and 7 AM. The user desires to run the appliance for 75 minutes and at a specified capacity.

The CCD requesting module 607 gathers the relevant information characterizing the requested consumption cycle (device identifier; capacity, C; duration, D; start-after time, Sa; and stop-before time, Sb). The data defines the consumption cycle data and is incorporated in the CCD request message.

The CCD requesting module 607 communicates the CCD to the next upstream node, the meter 608, in the electric power network 600. The CCD responding module 609 compares the received CCD request with an existing schedule based on already-received CCD requests, if any, from one or more of the other electric-powered devices 606b, 606c so as to identify possible times when the cycle can be scheduled to start, without exceeding the ceiling capacity of the meter 608. If at least one time is available, then the scheduling decision is moved up the tree structure representing the electric power network to the next upstream node, which illustratively comprises the station 614. When the CCD request is conveyed by the CCD responding module, the request can be updated to reflect the boundaries of the identified time alternatives (e.g., "start after" tick, "stop before" tick).

If time is not available given the imposed constraints, then the CCD request is either denied or, in an alternate embodiment, the CCD request is updated to reflect the boundaries of the identified alternatives minimizing the overall consumption (even if exceeding the ceiling capacity), and then passed to the next upstream node in the network parent station.

The determination process is repeated at each upstream node, where the CCD request is either passed to the next upstream node (possibly after some update), or denied.

If passed to the highest-level node, illustratively the power generation station 616, the CCD request is again processed as already described by a CCD responding module communicatively linked to the highest-level node. If at least one available time that meets the established constraints is found, then scheduling is performed by selecting a time (preferably, the earliest possible available time). The overall scheduling is updated accordingly, and the CCD response message is passed downwards to the node from which the CCD request was received. In turn, each node updates locally its scheduling and passes the CCD response downward, until it arrives at the CCD responding module 609 communicatively linked to the meter 608. Eventually, the CCD response is received by the CCD requesting module 607 communicatively linked to the device 606a. Upon receipt of the CCD response, the CCD requesting module 607 schedules the next-to-occur cycle according to the information contained in the CCD response if the response is a positive one.

Figure 7:
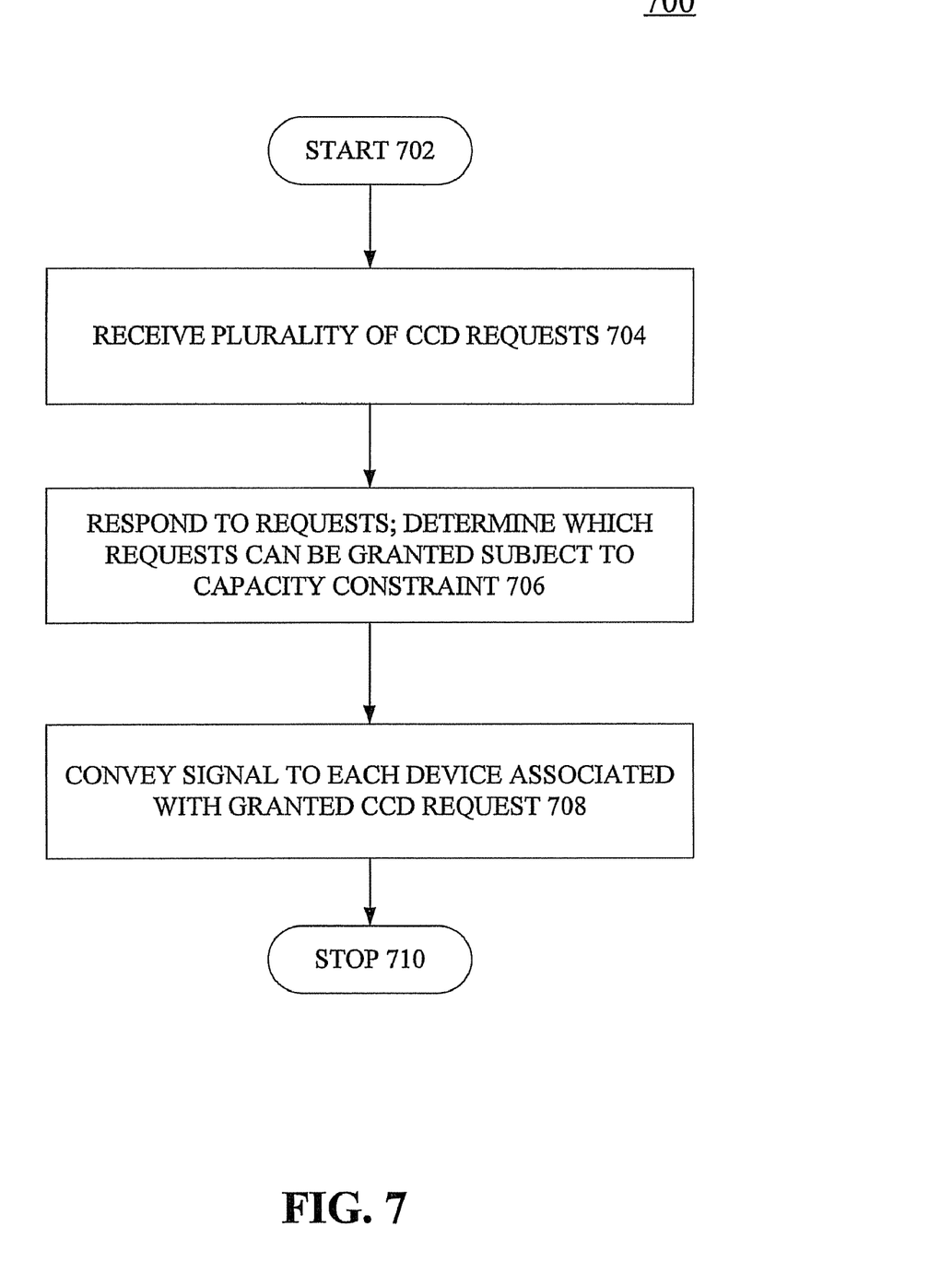
FIG. 7 is a flowchart of exemplary steps in a method for scheduling power consumption cycles, according another embodiment of the invention.

Referring now to FIG. 7, a flowchart of exemplary steps in a method 700 for scheduling electric power consumption cycles is shown. The method 700, after starting at block 702, includes receiving at block 704 a plurality of device-specific consumption cycle data (CCD) requests. Each CCD request uniquely corresponds to an electric-powered device and specifies for the corresponding device a required power consumption capacity and power consumption duration. The method 700 includes, at block 706, responding to the plurality of CCD requests by determining which requests can be granted subject to a predetermined capacity constraint of a power network to which each device is communicatively linked. At block 708, the method 700 further includes conveying to each device corresponding to a granted CCD request a signal indicating a start time for beginning a corresponding power consumption cycle. The method 700 illustratively concludes at block 710.

According to one embodiment, the step of responding can comprise determining a maximum number of requests that can be granted subject to the predetermined capacity constraint. Additionally, the method 700 can further include receiving at least one CCD request at a meter communicatively linked to at least one of the devices. According to the method 700, if one or more previous CCD requests have been granted at the meter, it can be determined whether a time is available within a pre-specified period during which the at least one CCD request can be granted at the meter without exceeding a ceiling capacity of the meter. If it is determined that the at least one CCD request can be granted at the meter without exceeding a ceiling capacity of the meter, then the at least one CCD request can be conveyed to a station communicatively linked to the meter. The method 700 further can include determining at the station whether the at least one CCD request can be granted without exceeding the predetermined capacity constraint of the power network.

According to another embodiment, the method 700 can include maintaining a CCD scheduling table at a meter communicatively linked to at least some of the electric powered devices. Moreover, the table, according to the method 700, can be updated in response to receiving at the meter a signal indicating a start time for beginning a power consumption cycle by a device communicatively linked to the meter. The method 700, according to yet another embodiment, can further include scheduling a next-to-occur consumption cycle at a device corresponding to a CCD granted request, the scheduling being based upon the signal indicating a start time for beginning a corresponding power consumption cycle.

Figure 8:
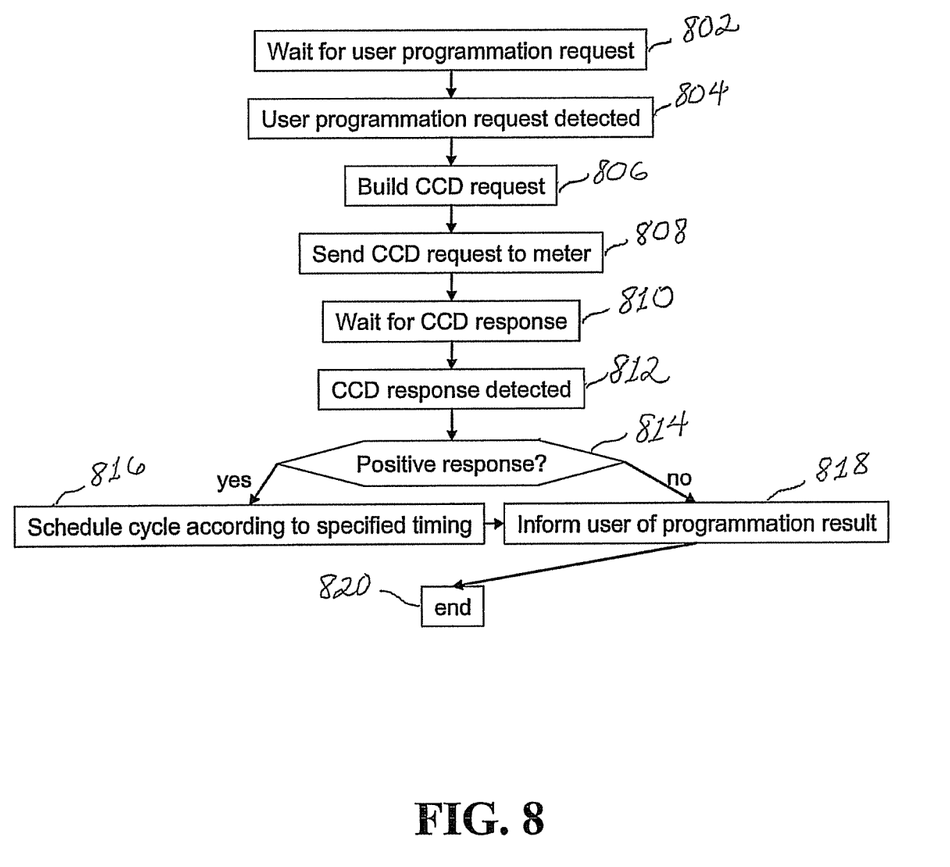
FIG. 8 is a flowchart of exemplary steps in a method for requesting an allocation of electric power, according to still another embodiment of the invention.

FIG. 8 is a flowchart of exemplary steps in a method 800 for requesting an allocation of electric power, according to still another embodiment of the invention. The method 800 optionally includes at block 802 waiting for a user programming request. When a programming request is detected at block 804, a consumption cycle data (CCD) request can be generated at block 806 in response to the detected programming request. At block 808, the CCD request can be conveyed to an upstream electric power network node, such as a meter. At block 810, a wait for a CCD response to the CCD request is initiated. When a CCD response is detected at block 812, a determination is made at decision block 814 as to whether the CCD response is positive. If the CCD response is positive, then a consumption cycle is scheduled, according to a specified timing, at block 816. Otherwise, at block 818, a user can be informed that the programming request is not granted. The method illustratively concludes at step 820.

According to another embodiment, the above-described process can be enhanced if the CCD response, when negative, further carries a proposed alternate timing that would make the CCD response positive. In this event, the alternate timing can be proposed to the user as an alternative to be accepted or not by the user. Moreover, all user responses can be associated with predetermined timeouts to preclude the user's having to take some additional action. According to still another embodiment, detecting a CCD response (block 812) can optionally include verifying that the CCD response message contains the identifier of the receiving device.

Figure 9:
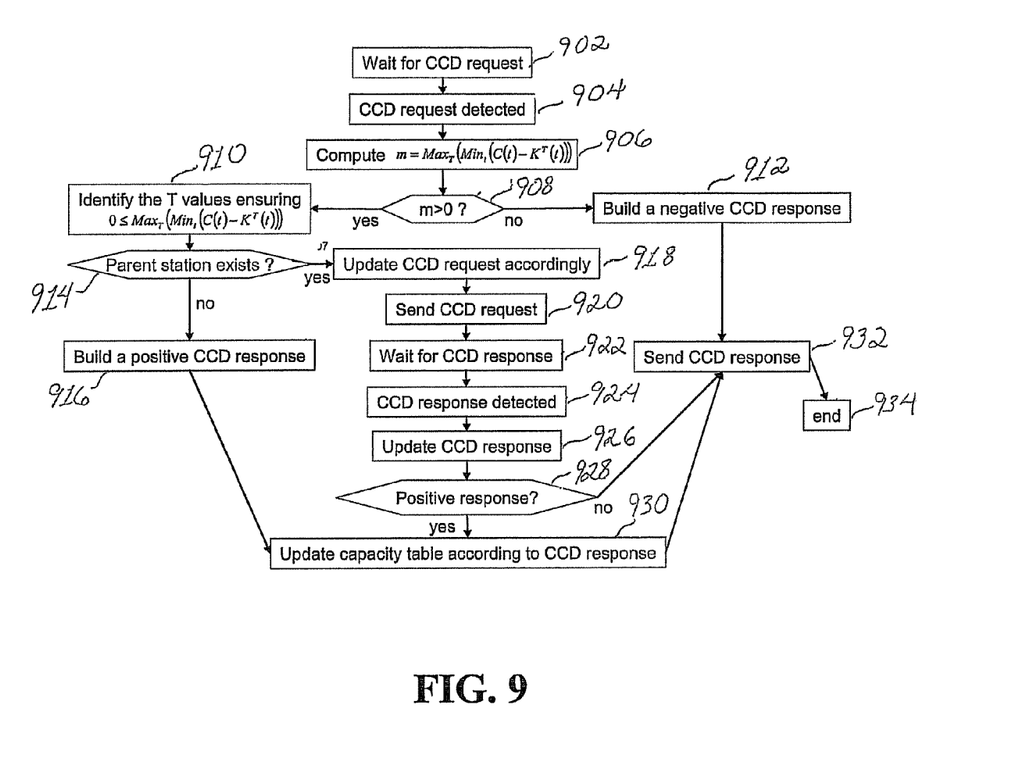
FIG. 9 is a flowchart of exemplary steps in a method for determining whether a request for an allocation of electric power can be granted subject to a predetermined constraint, according to yet another embodiment of the invention.

FIG. 9 is a flowchart of exemplary steps in a method 900 for determining whether a request for an allocation of electric power can be granted subject to a predetermined constraint, according to yet another embodiment of the invention. The method 900 optionally includes waiting for a CCD request. When at block 904 a CCD request is detected, a ceiling capacity parameter can be computed at block 906. The parameter, m, can be computed, as already described, according to the equation $$m = \text{Max}_T(\text{Min}_t(C(t) - K^T(t)),$$

where C represents capacity as a function of time, K is, again, duration, as a function of time, indexed to depend on time, T, when an associated consumption cycle starts. Again, T ∈ [Sa, Sb−D] and t ∈ [Sa, Sb].

If the parameter, m, is determined at decision block 908 to be greater than zero, then the method proceeds to block 910 where a value T is identified which ensures that the parameter, m, is greater than or equal to zero. If it is determined at decision block 914 that no parent station exists, then a positive CCD response is generated at block 916. The method then moves to block 930, where a capacity table can optionally be updated in accordance with the CCD response. The CCD response is sent at step 932.

If, however, a parent station does exist, the method proceeds to block 918, at which point the CCD request is updated. The updated CCD response is sent to the parent station at block 920. Waiting for a CCD response is initiated at block 922. When at block 924 a CCD response is detected the CCD response is updated at block 926. If at decision block 928 it is determined that the CCD response is positive, then the method proceeds to block 930 and a capacity table corresponding to the parent station is updated accordingly, after which the CCD response is sent at block 932.

If at decision block 908 is determined that the parameter, m, is not greater than zero, then the method proceeds to block 912, where a negative CCD response is generated. The CCD response is send at block 932. The method 900 illustratively concludes at block 934.

Detection of a CCD request (block 904) optionally can include the verification that the CCD request message contains the identifier of the receiving meter or station. According to a particular embodiment, a negative CCD response can be generated (block 912) as follows: echoing the CCD request; removing from the ID list the identifier of the handling meter or station; removing the period P parameter; and introducing a result parameter, with, for example, value R=false. According to another embodiment, a positive CCD response can be generated (block 916) as follows: echoing the CCD request; removing from the ID list the identifier of the handling meter or station; removing the period P parameter; introducing a time parameter T equal to the lowest value of the set of values T ensuring that $0 \leq Max_T(Min_t(C(t)-K^T(t)))$; and introducing a result parameter with value R=true.

Updating the CCD request (block 918) can comprise: adding in the ID list the identifier of the parent station; and updating the period P parameter to reflect the set of T values identified at step 206.

According to a particular embodiment, waiting for a CCD response can include handling the event that an expected CCD response never returns to the meter or station that conveyed the CCD request. The handling can include starting a timer, waiting to receive a time-out event, and then handling the event as a should-not-occur condition.

Updating a received CCD response, according to another embodiment can include removing from an identification the identifier of the corresponding handling meter or station. Updating the capacity table can include decreasing by an amount K the remaining capacity in the records corresponding to the interval [T, T+D].

The invention, as also already noted, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method for scheduling electric power consumption cycles in a power network, the method comprising:

receiving a plurality of device-specific consumption cycle data (CCD) requests, wherein each CCD request uniquely corresponds to an electric-powered device and specifies for the corresponding device a required power consumption capacity, a power consumption duration, and a specified time period during which an allocation of power is requested, and wherein each CCD request is generated by a CCD requesting module communicatively linked to a respective electric-powered device;

responding to the plurality of CCD requests by determining which requests can be granted subject to a predetermined capacity constraint of the power network to which each device is communicatively linked, wherein the determination is carried out by a CCD responding module of the power network, the CCD responding module being communicatively linked to each CCD requesting module and within a meter or station of the power network; and conveying to each device corresponding to a granted CCD request a signal indicating a start time for beginning a corresponding power consumption cycle.

2. The method of claim 1, wherein responding comprises determining a maximum number of requests that can be granted subject to the predetermined capacity constraint.

3. The method of claim 1, further comprising receiving at least one CCD request at a meter communicatively linked to at least one of the devices and, if one or more previous CCD requests have been granted at the meter, determining whether a time is available within a pre-specified period during which the at least one CCD request can be granted at the meter without exceeding a ceiling capacity of the meter.

4. The method of claim 3, further comprising conveying the at least one CCD request to a station communicatively linked to the meter if it is determined that the at least one CCD request can be granted at the meter without exceeding a ceiling capacity of the meter.

5. The method of claim 4, further comprising determining at the station whether the at least one CCD request can be granted without exceeding the predetermined capacity constraint of the power network.

6. The method of claim 1, further comprising maintaining a CCD scheduling table at a meter communicatively linked to at least some of the electric powered devices, and updating the table in response to receiving at the meter a signal indicating a start time for beginning a power consumption cycle by a device communicatively linked to the meter.

7. The method of claim 1, further comprising scheduling a next-to-occur consumption cycle at a device corresponding to a CCD granted request, the scheduling being based upon the signal indicating a start time for beginning a corresponding power consumption cycle.

8. A method for scheduling an electric power consumption cycle in a power network, the method comprising:

generating a consumption cycle data (CCD) request at a device connected to the power network, the CCD request comprising a device identifier, a required power consumption capacity, and a power consumption duration and requesting an allocation of power during a specified time period, wherein the CCD request is generated by a CCD requesting module communicatively linked to the device;

conveying the CCD request to a node communicatively linked to the device and to the power network;

receiving a CCD reply from a CCD responding module within the node and within a meter or station of the power network; and scheduling a next-to-occur consumption cycle based upon the CCD reply if the CCD reply indicates that the CCD request can be granted subject a predetermined capacity constraint.

9. The method of claim 8, further comprising generating a user-directed message if the CCD request cannot be granted subject the predetermined capacity constraint.

10. The method of claim 8, further comprising specifying in the CCD reply an alternate time period if the CCD request cannot be granted subject the predetermined capacity constraint.

11. The method of claim 8, further comprising verifying that the CCD reply contains the device identifier.

12. The method of claim 11, further comprising, if the station has conveyed the CCD to the upstream station:

receiving a CCD reply from the upstream station;

if the CCD reply is a positive reply granting the CCD request to the device, updating a scheduling table based upon data contained in the positive reply; and conveying the positive reply to the device, the positive reply specifying a time for the device to initiate power consumption requested in the CCD request.

13. A method for scheduling electric power consumption cycles in an electric power network, the method comprising:

receiving a device-specific consumption cycle data (CCD) request at a station communicatively linked to an electric-powered device and the electric power network, wherein the CCD request comprises a device identifier corresponding to the device, a required power consumption capacity, a power consumption duration, and a specified time period during which an allocation of power is requested, and wherein the CCD request is generated by a CCD requesting module communicatively linked to the device;

responding to the CCD request by determining whether the CCD request can be granted subject to a predetermined capacity constraint;

if the request can be granted and the station is connected to an upstream station, conveying the CCD request to the upstream station, wherein the determination is carried out by a CCD responding module within a meter or station of the power network; and if the station is not connected to an upstream station, conveying a positive CCD reply granting the CCD request to the device if the request can be granted or otherwise conveying a negative CCD reply denying the CCD request if the request cannot be granted.

14. The method of claim 13, wherein the capacity constraint comprises at least one among a physical constraint and a contractually-imposed constraint.

15. A system for scheduling electric power consumption cycles in an electric power network, the system comprising:

an electric-powered device driven by power supplied by the electric power network;

a consumption cycle data (CCD) requesting module communicatively linked to the electric-powered device, wherein the CCD requesting module is configured to generate a CCD request requesting allocation of electric power from the electric power network, wherein the CCD request comprises a device identifier corresponding to the device, a required power consumption capacity, a power consumption duration, and a specified time period during which an allocation of power is requested;

an electric power network node electrically connected to the electric-powered device from which electric power is conveyed to the electric-powered device; and a CCD responding module within the electric power network node and within a meter or station of the power network, the CCD responding module communicatively linked to the CCD requesting module, wherein the CCD responding module is configured to determine whether the request for allocation of power can be granted subject to a predetermined capacity constraint.

16. The system of claim 15, wherein the electric power network node comprises a meter, and wherein the CCD responding module is configured to determine whether the request for allocation of power can be granted by comparing the request to a schedule of previously granted requests for an allocation of power received from other electric-powered devices and, based on the comparison, determining whether the request for allocation of power can be granted subject to the predetermined capacity constraint, the predetermined capacity constraint being a predetermined ceiling capacity of the meter, based upon a schedule of already-granted requests for allocation of power from other electric-powered devices connected to the meter.

17. The system of claim 16, wherein the meter is configured to convey the CCD request to an upstream electric power network node if there exists at least one time at which electric power can be allocated to the electric-powered device without exceeding the ceiling capacity of the meter.

18. The system of claim 17, wherein the electric power network node comprises a terminal node, and wherein the terminal node is configured to convey a CCD response message indicating a time for the electric-powered device to initiate an electric power consumption cycle if it is determined that the request for allocation of power can be granted subject to the predetermined capacity constraint, the predetermined capacity constraint being a predetermined ceiling capacity of the electric power network, based upon a schedule of already-granted requests for allocation of power from other electric-powered devices connected to the electric power network.

19. The system of claim 16, wherein the CCD responding module is further configured to update the schedule if the request for allocation of power is granted.

* * * * *